United States Patent [19]

Caine

[11] Patent Number: 5,758,693
[45] Date of Patent: Jun. 2, 1998

[54] HOSE END CAP WITH CLAMP MECHANISM

[75] Inventor: Donald R. Caine, Greensboro, N.C.

[73] Assignee: CAMCO Manufacturing, Inc., Greensboro, N.C.

[21] Appl. No.: 217,697

[22] Filed: Mar. 25, 1994

Related U.S. Application Data

[63] Continuation-in-part of Ser. No. 81,118, Jun. 25, 1993, Pat. No. 5,383,494.

[51] Int. Cl.$^6$ ............................................. F16L 35/00
[52] U.S. Cl. ........................... 138/89; 138/96 R; 285/903
[58] Field of Search ........................ 138/89, 96 R, 138/96 T, 99, 89.1-89.4; 285/901, 903

[56] References Cited

U.S. PATENT DOCUMENTS

| | | |
|---|---|---|
| 440,168 | 11/1890 | Kurtz . |
| 767,893 | 8/1904 | Jewell . |
| 1,113,080 | 10/1914 | Wilson . |
| 1,498,563 | 6/1924 | Morrison et al. ............ 138/96 R |
| 1,934,681 | 11/1933 | Damsel . |
| 2,061,366 | 11/1936 | Mazurie ............................ 138/96 |
| 2,321,667 | 6/1943 | Foster ............................... 138/89 |
| 2,433,930 | 1/1948 | Speer ................................ 285/71 |
| 3,075,358 | 1/1963 | Becker et al. ...................... 61/53 |
| 3,484,121 | 12/1969 | Quinton ........................... 285/242 |
| 3,713,463 | 1/1973 | Bywater, Jr. ................. 138/96 R |
| 3,744,528 | 7/1973 | Vestal ............................... 138/89 |
| 4,155,574 | 5/1979 | Hulsey ......................... 138/96 R |
| 4,157,100 | 6/1979 | Turk .............................. 138/96 R |
| 4,349,048 | 9/1982 | Clark ............................ 138/96 R |
| 4,660,860 | 4/1987 | Todd ............................... 285/12 |
| 4,678,097 | 7/1987 | Crute ............................. 220/288 |
| 4,688,833 | 8/1987 | Todd .............................. 285/175 |
| 4,708,370 | 11/1987 | Todd ............................... 285/12 |
| 4,777,985 | 10/1988 | Arduini et al. ................... 138/96 |
| 4,799,716 | 1/1989 | Kujawa et al. ................. 285/334 |
| 4,854,349 | 8/1989 | Foreman ........................... 138/89 |
| 5,042,844 | 8/1991 | Iida et al. .......................... 285/7 |
| 5,048,571 | 9/1991 | Ellis ................................ 138/96 |

FOREIGN PATENT DOCUMENTS

| | | |
|---|---|---|
| 784239 | 7/1935 | France . |
| 2644223 | 9/1990 | France . |
| 130894 | 12/1932 | Germany . |
| 865885 | 7/1949 | Germany . |
| 168493 | 9/1959 | Germany . |
| 36 19 299 | 12/1987 | Germany . |
| 2048414 | 12/1980 | United Kingdom . |

*Primary Examiner*—David Scherbel
*Assistant Examiner*—Patrick F. Brinson

[57] ABSTRACT

An end cap for a flexible hose is provided which includes a depending pivotable member attached to an outer wall. The pivotable member can be swung upwardly between the inner and outer walls of the end cap to secure the end of a flexible hose therein. The end cap is integrally formed such as by molding from a medium density polymeric material such as polyethylene and includes an integral clamp mechanism to insure retention of a flexible hose therein.

14 Claims, 2 Drawing Sheets

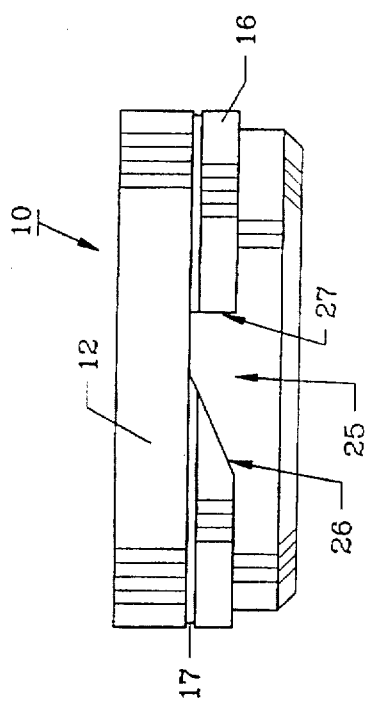
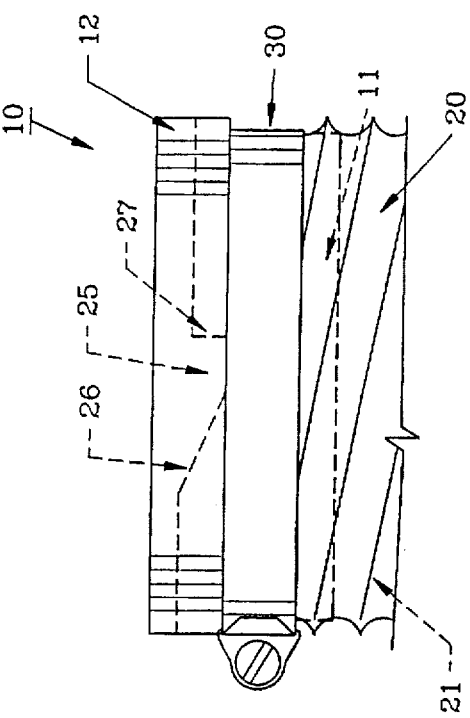
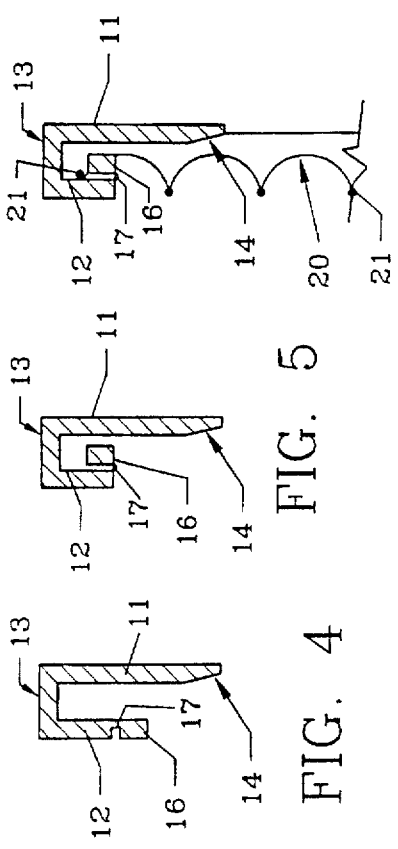
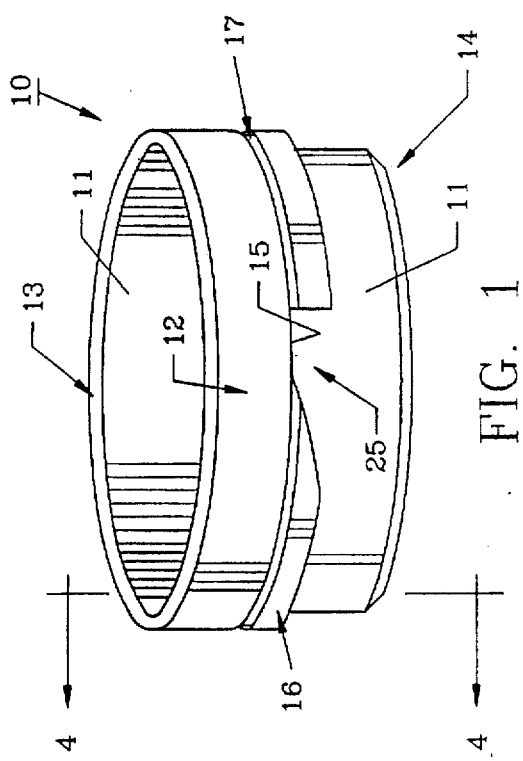

HOSE END CAP WITH CLAMP MECHANISM

This is a continuation-in-part of U.S. Pat. No. 5,383,494 issued 24 Jan. 1995.

BACKGROUND OF THE INVENTION

1. Field of the Invention

The invention herein pertains to flexible sewage hose fittings as are connected to recreational vehicles (RV's) and pertains particularly to an end cap which can be placed on the end of the hose and tightly secured thereto by an integrally formed clamp mechanism.

2. Description of the Prior Art and Objectives of the Invention

Sewage hoses are connected to RV's during overnight stops in parks and campgrounds in increasing numbers as more and more people prefer this type of vacation. Flexible sewage hoses generally used are generally formed of a vinyl outer tube and include an embedded spiral steel wire support. One end of the flexible sewage hose is joined to the discharge end of the RV sewage system which may consist of a pipe or fitting extending therebeneath. The other end of the sewage hose is then connected to a septic tank or sewage treatment facility provided. The ends of the flexible sewage hose are often cut with a knife or other instrument and may be uneven. Thus, when the uneven ends are attempted to be connected to the RV or other fittings, it is difficult to make the connection. An improper connection will allow raw sewage to escape therefrom. Personal injury may result due to the or protruding wire at the end of the hose.

Which flexible sewage end caps have been previously used, such previous caps may become dislodged under stress to the hose. Such ends caps are generally formed of flexible plastic materials which may expand or distort in hot weather or when the temperature of the plastic material reaches a certain point.

With the known problems associated with conventional flexible sewage hose connections, the present invention was conceived and one of its objectives is to provide a flexible sewage hose end cap which can be quickly, easily and securely affixed to the end of a hose.

It is another objective of the present invention to provide a cylindrically shaped sewage hose end cap which includes a tightenable clamp mechanism formed from L-shaped flexible wall ends joined by a threaded member.

It is yet another objective of the present invention to provide a flexible sewage hose end cap which can be rapidly attached to the RV discharge and septic connection by an inexperienced user using only a simple screwdriver.

It is yet another objective of the present invention to provide a flexible sewage hose end cap which is relatively inexpensive to manufacture and can be provided at a reasonable cost to the purchaser.

Various other objectives and advantages of the present invention become apparent to those skilled in the art as a more detailed description is set forth below.

SUMMARY OF THE INVENTION

The objectives reiterated above can be realized by providing a flexible hose end cap which is integrally molded from a flexible polymeric material such as a medium density polyethylene. The end cap contains concentric inner and outer cylindrical walls which are joined at the top and which are spaced apart to allow a conventional flexible sewage hose end to rest therebetween. Depending from the outer wall in substantially continuous encircling fashion is a pivotable member which is hingedly attached at the bottom of the outer wall. Thus, by folding the pivotable member upwardly between the inner and outer walls, a lock is provided on the hose end which will prevent the end of the hose previously positioned therein from escaping. The pivotable lock defines a notch which will assist while attaching the hose end cap to the hose. Once the pivotable member locks the hose end between the inner and outer walls, a threaded member can be tightened to urge flexible outer wall ends together to effect a clamp in preventing the hose end cap from releasing the hose end even under extreme adverse use conditions.

BRIEF DESCRIPTION OF THE DRAWINGS

FIG. 1 demonstrates in perspective fashion a hose end cap of the invention;

FIG. 2 shows a side elevational view of the hose end cap as shown in FIG. 1;

FIG. 3 pictures the hose end cap seen in FIG. 2 with a conventional flexible sewage hose positioned thereon and with an adjustable clamp;

FIG. 4 depicts a cross-sectional view along lines 4—4 as seen in FIG. 1;

FIG. 5 illustrates the cross-sectional view of FIG. 4 but with the pivotable member in an upward or "locked" position;

FIG. 6 demonstrates the cross section of end cap 10 as seen in FIG. 5 with the sewage hose end locked therein;

DESCRIPTION OF THE PREFERRED EMBODIMENT

Figure 8:
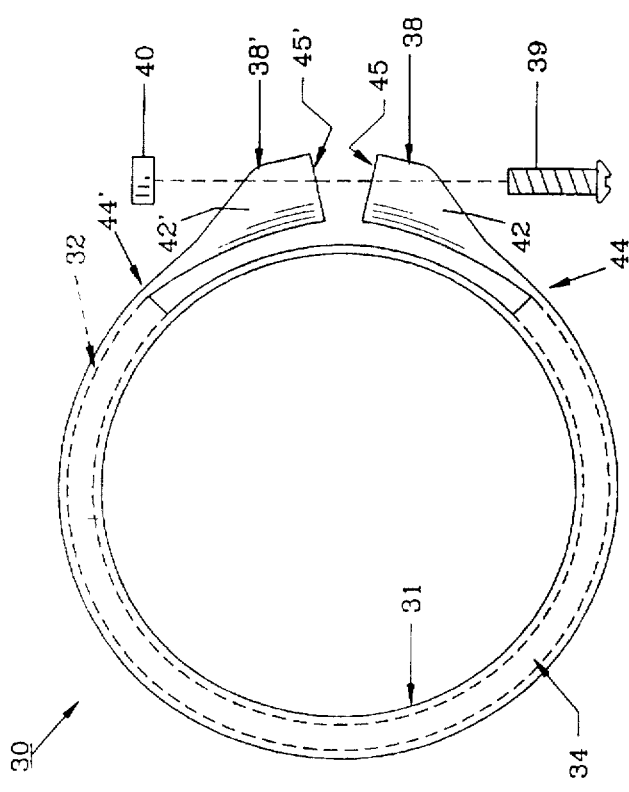
FIG. 8 depicts a top view of the hose end cap of FIG. 7.
Figure 9:
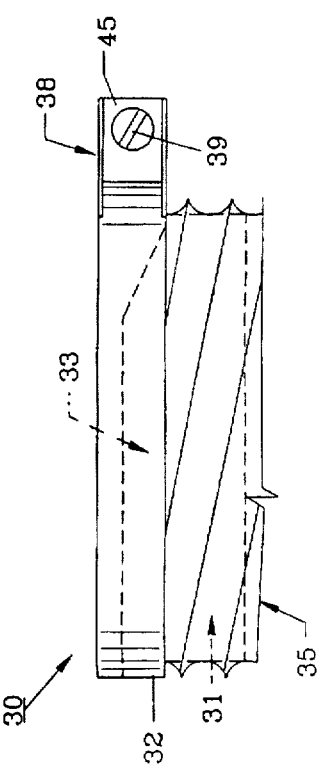
FIG. 9 illustrates a side elevational view of the hose end cap FIG. 7.
Figure 7:
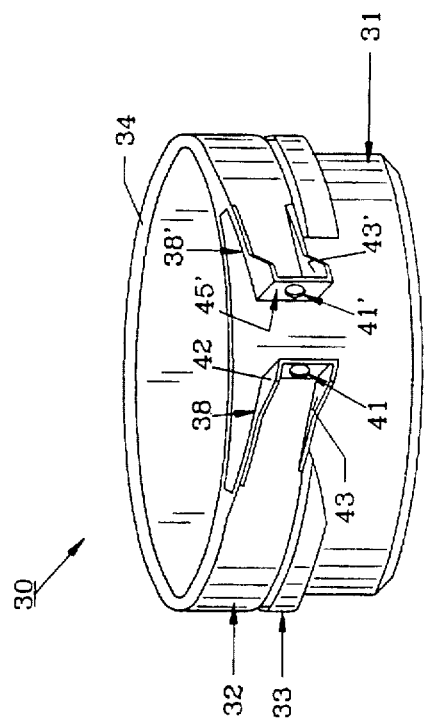
FIG. 7 shows a front perspective view of a hose end cap with an integral clamp mechanism.

The preferred form of the hose end cap with an integral clamp mechanism is shown in FIGS. 7-9 and includes a cylindrically shaped hose end cap formed from a polymeric material such as by integrally molding conventional medium density polyethylene. The end cap as seen includes an outer wall and an inner wall which are joined along the top providing a space therebetween for reception of a flexible sewage hose end. A pivotable lock member is also provided which is hingedly joined to the lower end of the outer wall and which can be moved or swung inwardly to lock the end of the sewage hose in place. The hinge comprises a thin, flexible wall segment and a notch or space is provided in the pivotable member which includes a vertical and biased side, as seen in FIG. 1. The biased side, when folded inwardly between the inner and outer walls, provides an inclined plane for sliding the end of the embedded wire of the hose thereon. The ends of the outer wall are flexible and are L-shaped to form a clamp mechanism which can be tightened by rotating a threaded member joined thereto with a nut. The clamp mechanism will help maintain the hose end cap on the hose during harsh use conditions.

DETAILED DESCRIPTION OF THE DRAWINGS AND OPERATION OF THE INVENTION

For a more complete understanding of the invention and its operation, turning now to the drawings, FIG. 1 shows a perspective view of end cap 10 which may be formed of conventional polymeric materials such as a medium density polyethylene and includes inner wall 11 and outer wall 12 which are joined together along top 13. As shown in FIG. 1, inner wall 11 is two times or longer than wall 12 and is tapered at its terminal end 14 as shown in FIGS. 4-6. Along the bottom end 15 (FIG. 1) of outer wall 12, pivotable member 16 is attached by hinge 17 which consists of a thin, flexible segment as shown more clearly in FIGS. 4 and 5. Although not usually needed, clamp 30 is shown in FIG. 3 which may be used when hose 20 is subjected to very high stresses such as sudden jerks or impact thereto to help maintain end cap 10 on an RV discharge or on a septic tank fitting.

In FIG. 4 pivotable member 16 is shown in an extended position whereas in FIG. 5 pivotable member is shown in a folded or locked position for securing flexible hose 20 also as seen in FIGS. 3 and 6. In FIG. 6 hose 20 is shown in cross-sectional view with wire spiral 21 exposed for clarity. As would be understood, hose 20 comprises a flexible polyvinyl chloride covering with an embedded continuous spiral or coil wire 21 therein. Pivotable member 16 as shown in FIG. 6 locks hose 20 between inner wall 11 and outer wall 12 as member 16 is folded inwardly and engages hose 20 which has been positioned between inner wall 11 and outer wall 12.

Pivotable member 16 as shown in FIGS. 1-6 comprises a substantially continuous ring which encircles inner wall 11. However, a discontinuous ring or tab-like projections could be used on outer wall 12 if desired.

Various flexible hose manufacturers produce hoses having either a left to right or a right to left spiral and in FIG. 3, hose 20 is shown with a right to left spiral. Pivotable member 16 defines notch 25 therein with one side 26 having a bias and with the other side 27 being substantially vertical. As shown, with pivotable member 16 placed in the locked position as seen in FIG. 5, biased side 26 of notch 25 somewhat parallels spiral 21 whereby hose 20 can be easily turned and secured onto end cap 10 by placing the end of spiral 21 into notch 25 and rotating end cap 10 thereon. As would be understood, for a fitting on a flexible hose having a left to right spiral wire embedded therein, side 26 would be vertical and side 27 would be biased to accommodate attachment thereto.

It has been found that end cap 10 can be integrally molded of a medium to low density polyethylene which is relatively inexpensive and suitable for its intended purposes. However, various other types of suitable materials may also be used.

As seen in FIG. 7, hose end cap 30 includes inner wall 31 which is joined to outer wall 32 along top 34. Inner wall 31 is spaced from outer wall 32 to allow flexible sewage hose 35 as shown in FIG. 9 to be positioned therebetween. Pivotal member 33 can be folded upwardly as shown in FIG. 9 to assist in locking hose 35 into end cap 30. However, under adverse use conditions such as occurs when hose 35 is inadvertently pulled, yanked or otherwise stressed, additional means to secure hose 35 to hose end cap 30 may be required. Under such conditions hose end cap 30 allows the use of clamp mechanism 36 which includes outer wall ends 38, 38' which are flexible and integrally molded with outer wall 32. As seen, wall ends 38, 38' are separated and are tightenable together such as with the use of threaded member 39 received by nut 40 as seen in FIG. 8. Threaded member 39 passes through apertures 41, 411 and flexible ends 38, 38' have top webbings 42, 42' and bottom webbings 43, 43' respectively. Nut 40 is rectangularly shaped and fits between top webbing 42' and bottom webbing 43' to therefore prevent rotation as threaded member 39 is tightened therein.

As further shown in FIG. 8, flexible ends 38, 38' will pivot along areas 44, 44' as threaded member 39 is tightened into nut 40. As tightening increases by rotating threaded member 39, flexible ends 38, 38' are urged closer together and are also urged inwardly towards inner wall 31 to effectively clamp hose 35 (not seen in FIG. 8) in place. As further shown in FIG. 7, L-shaped flexible ends 38, 38' include planar sections 45, 45' which define apertures 41, 41'.

The illustrations and examples provided herein are for explanatory purposes and are not intended to limit the scope of the appended claims.

I claim:

1. A hose end cap comprising: a continuous inner wall, an outer wall, said continuous inner wall joined to said outer wall, said continuous inner wall spaced from said outer wall to allow hose end reception therebetween, said outer wall comprising a pair of flexible ends, said ends spaced one from the other, a threaded member, said threaded member adjustably affixed to said flexible ends to draw said ends together and urge said outer wall inwards towards said continuous inner wall to clamp a hose end between said continuous inner wall and said outer wall.

2. The hose end cap as claimed in claim 1 wherein said outer wall ends each define an aperture.

3. The hose end cap as claimed in claim 2 wherein said threaded member is positioned in said apertures.

4. The hose end cap as claimed in claim 1 wherein each of said outer wall flexible ends are L-shaped.

5. The hose end cap as claimed in claim 1 wherein said flexible ends are integrally molded with said outer wall.

6. The hose end cap as claimed in claim 1 and including a nut, said nut for receiving said threaded member.

7. A hose end cap having a clamp mechanism comprising: a continuous inner wall, an outer wall, a top, said top joined to said continuous inner and said outer walls, said continuous inner wall spaced from said outer wall to allow hose reception therebetween, said outer wall comprising a pair of flexible ends, said flexible ends spaced one from the other, a means to tighten said flexible ends, said tightening means joined to said flexible ends to urge said ends together to clamp a hose end securely between said continuous inner and said outer walls.

8. The hose end cap as claimed in claim 7 and including a pivotal member, said pivotal member attached to the bottom edge of said outer wall.

9. The hose end cap as claimed in claim 7 wherein said flexible ends are each somewhat L-shaped.

10. The hose end cap as claimed in claim 7 wherein said tightening means comprises a threaded member.

11. The hose end cap as claimed in claim 8 wherein said flexible ends extend beyond said pivotal member.

12. The hose end cap as claimed in claim 7 and including a pivotal member attached to said outer wall for movement between said inner wall and said outer wall to secure a hose end therebetween.

13. A hose end cap having a clamp mechanism comprising: an inner wall, an outer wall, a top, said top joined to said inner and said outer walls, said inner wall spaced from said outer wall to allow hose reception therebetween, said outer wall comprising a pair of flexible ends, said flexible ends spaced one from the other, a means to tighten said flexible ends, said tightening means joined to said flexible ends to urge said ends together to clamp a hose end between said inner and said outer walls and a pivotal member attached to said outer wall by a hinge for movement between said inner wall and said outer wall to secure the hose end therebetween.

14. The hose end cap as claimed in claim 13 wherein said inner wall is continuous.

* * * * *